United States Patent [19]

Kramer

[11] Patent Number: 5,095,840

[45] Date of Patent: Mar. 17, 1992

[54] FENDER PROTECTIVE STRUCTURES

[75] Inventor: James H. Kramer, Akron, Ohio

[73] Assignee: The B.F. Goodrich Company, Akron, Ohio

[21] Appl. No.: 772,460

[22] Filed: Sep. 4, 1990

[51] Int. Cl.$^5$ .................................................. B63B 59/02
[52] U.S. Cl. ................................ 114/219; 267/140; 114/45
[58] Field of Search ..................... 114/45, 219, 47; 405/212, 215; 267/140; 14/76

[56] References Cited

U.S. PATENT DOCUMENTS

| | | | |
|---|---|---|---|
| 287,156 | 10/1883 | Peetz | 114/47 |
| 2,027,800 | 1/1936 | Whitlock | 405/215 |
| 2,890,880 | 6/1959 | Hompe et al. | 114/219 X |
| 3,014,710 | 12/1961 | Layne | 114/219 X |
| 3,235,244 | 9/1963 | Hein | 267/1 |
| 3,554,527 | 1/1971 | Hall | 114/219 |
| 3,610,192 | 10/1971 | Mauretzen | 114/45 |
| 3,798,916 | 3/1974 | Schwemmer | 61/48 |
| 3,843,476 | 10/1974 | Kramer | 161/112 |
| 3,863,589 | 2/1975 | Guienne | 114/219 |
| 3,975,491 | 8/1976 | Kramer | 264/255 |
| 4,436,274 | 3/1984 | Kramer | 248/633 |
| 4,482,592 | 11/1984 | Kramer | 428/67 |
| 4,596,734 | 6/1986 | Kramer | 428/213 |
| 4,679,517 | 7/1987 | Kramer | 114/219 X |

*Primary Examiner*—Ed Swinehart
*Attorney, Agent, or Firm*—Joseph Januszkiewicz

[57] ABSTRACT

An impact pad, having a first outer layer of ultra-high molecular weight material, an intermediate layer of elastomeric material and a third base layer of rigid material, is mounted on a support base of the hull of a ship for absorbing impact forces. The base layer has a channel member secured thereto to facilitate the attachment to the support base of the hull of a ship and provide rigidity to the pad. Fasteners extending through the channel member and the base layer are used to fasten such pad to the support base. A plurality of bores in the base layer and elastomeric intermediate layer facilitates the impact loading and impact forces on the outer layer.

9 Claims, 3 Drawing Sheets

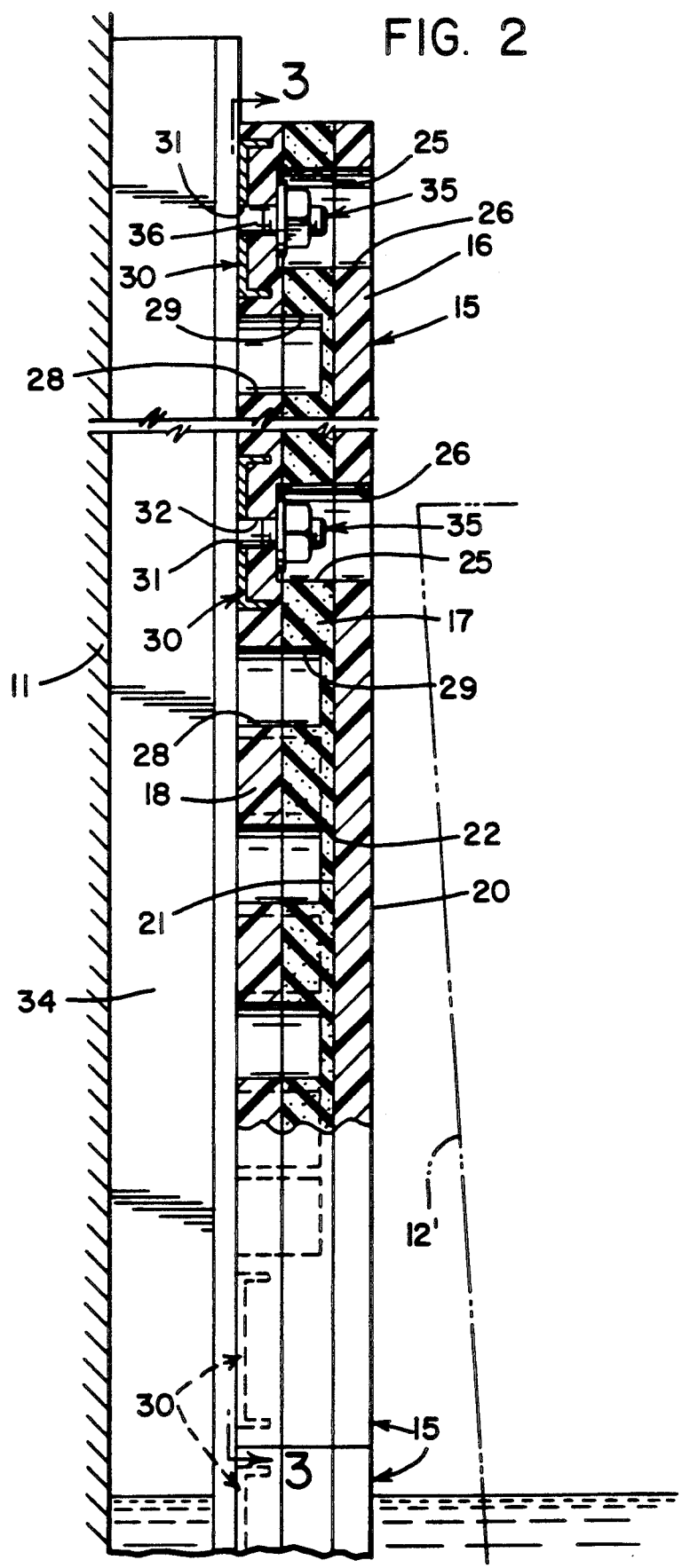

FENDER PROTECTIVE STRUCTURES

BACKGROUND OF THE INVENTION

This invention relates to an impact pad for absorbing forces and more particularly to an impact pad or fender protective means for use on a floating structure for absorbing impact forces.

In the operation of docking a ship, because of the speed of approach and the swells of the waves, currents and winds, it is imperative to provide a protective docking system to reduce impact and damage to the ship. More particularly, an impact pad for an impact fender system for use in the docking of a first vessel into the hull of a second vessel in open waters requires the additional consideration that both vessels interact under these complex conditions and, therefore, simple expedients of large shock absorbing devices do not provide the required protection because their weight, their friction factors and their installation cost are too great for economic use. The present invention contemplates the use of a new and improved impact pad or fender protective system that allows for ease of installation and replacement as well as being economical. The normal impact pad for use in these vessels are Douglas fir timbers. While the impact pad of the present invention can be used for docking at wharfs, the present invention is particularly useful in the hull of a first ship that carries within it a set of smaller crafts for ferrying operations. The wood reinforcing timbers often used in the hulls of these larger receiving ships or vessels will splinter, split and require numerous replacements. Rubber fender systems offer too much friction for use in these conditions. The present invention uses a composite impact pad that provides a low friction contact surface to minimize the high shearing forces of engagement while utilizing a novel rubber in combination therewith to withstand effectively the impact forces encountered in such ship or vessel while providing an economical structure to achieve this end.

SUMMARY OF THE INVENTION

The present invention contemplates an impact pad in a fender system that utilizes pads in combination wherein each pad has an outer layer of ultra high molecular weight material that is secured to an intermediate layer of elastomeric material which in turn is secured to a third layer also composed of ultra high molecular weight material in combination with a rigid integral member.

BRIEF DESCRIPTION OF THE DRAWINGS

FIG. 2 is a cross sectional side elevational view taken of the fender system on line 2—2 of FIG. 1;

DETAILED DESCRIPTION

Figure 1:
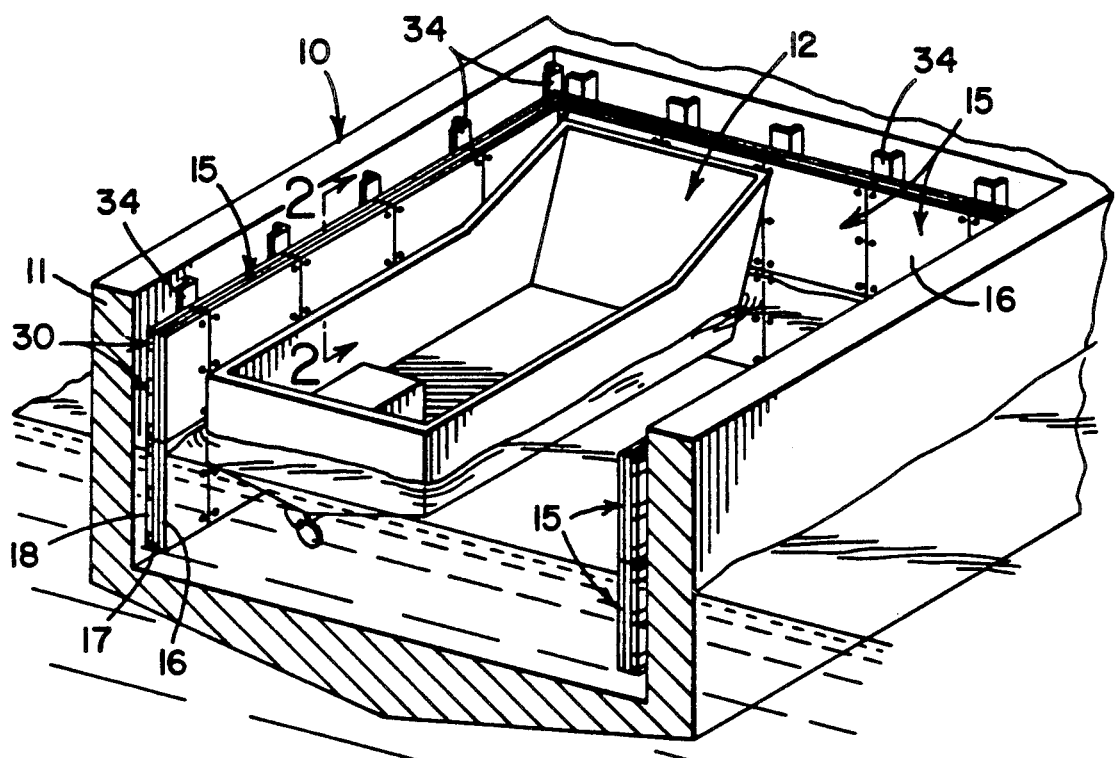
FIG. 1 is a perspective view illustrating one form of the invention wherein a larger vessel, only partly shown, has the impact pads disposed within the hull, with a second vessel being received in the hull of such first vessel.

Referring to the drawings, wherein like reference numerals designate like or corresponding parts throughout the several views, there is shown in FIG. 1 a portion of a ship or large vessel 10 whose hull is designated by the numeral 11. Such vessel 10 is a docking vessel with an open hull capable of lowering a door, not shown, to allow water into the hull to permit a smaller vessel 12 such as landing crafts thereinto whereby the larger vessel 10 may transport such smaller vessels 12 for ferrying operations close to land. The side of the smaller vessel 12 is designated by a dot dash line 12' in FIG. 2.

Located above and below the water line, as depicted in FIG. 1, are a plurality of impact pads 15 placed in a horizontal and vertical locations in the hull of the vessel and suitably attached to such hull of the larger vessel 10. Each impact pad 15 is a composite member which includes a longitudinally extending inwardly disposed (as viewed in the hull of the larger vessel 10) solid piece of ultra-high molecular weight polyethylene material 16, a resilient second elastomeric layer 17 and integrally attached to such second layer 17 a layer of rigid material such as ultra-high molecular weight polyethylene material considered a third layer 18.

The first layer or outermost layer 16, as viewed from inside the hull of the larger vessel 10, has an outer surface 20 and an inner surface 21 which are substantially parallel. Such first layer is composed of an ultra-high molecular weight polyethylene flame retardant material containing no halogen nor cyanide compounds and which has a melt flow index less than 0.15 measured in accordance with the test procedure of ASTM 1238-65T modified by an additional 3 kilogram load.

The second elastomeric layer 17 has an outer surface 22 that is in abutting contact with and suitably secured as by bonding to the inner surface 21 of the first layer 16 of the ultra-high molecular weight material. Such second layer has a plurality of rows of bores 25 which are laterally and longitudinally spaced. Such bores 25, as molded into the second layer 17 and extend entirely through such second layer. The first layer 16 also has a plurality of rows of bores 26 which are laterally and longitudinally spaced and in alignment with bores 25 to in effect define a continuous bore that extends through both layers 26 and 17 (the ultra high molecular weight material and the elastomeric material) for a purpose to be described. Preferably in the example shown (FIG. 3) and described, bores 25 and 26 are along the upper margins, lower margins and the center portion of the impact pad. The number of rows of bores 25 and 26 can be increased or decreased to accommodate the size of pad to be installed.

Figure 3:
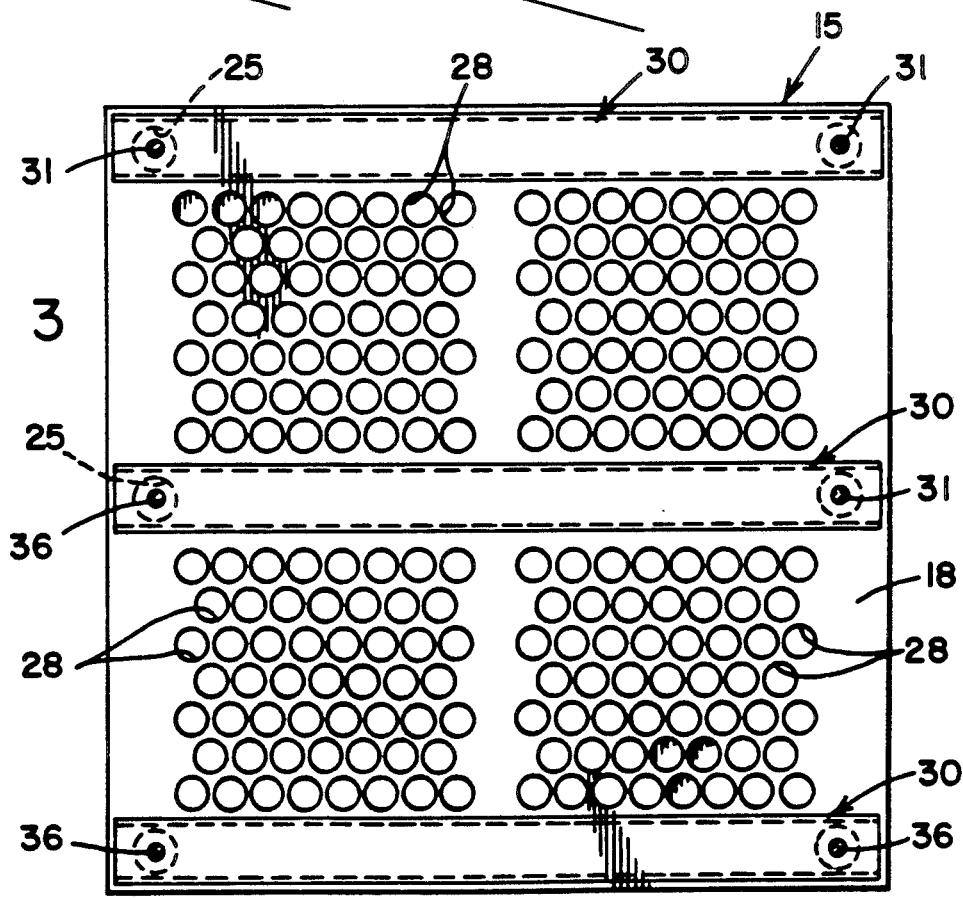
FIG. 3 is a front elevational view of an impact pad of the fender system taken on line 3—3 of FIG. 2.

The third layer 18 can be made from the same material as the first layer 16 of ultra-high molecular weight material and suitably secured as by bonding to the second layer of elastomeric material 17 during the molding process. Such third layer 18 can also be made from other materials that have the physical property of rigidity such as metal, a fiberglass reinforced plastic, fabric filled with epoxy or a fabric phenolic to give the impact pad 15 rigidity. In the case of a metal layer 18, such layer can be relatively thin such as one fourth of an inch (0.635 cm) thick to reduce cost and weight of the finished product yet provide a facile means of attaching the impact pad to the structural support in the hull of the vessel 10. Such third layer 18 has a plurality of rows of bores 28 that extend completely through such layer and are in axial alignment with bores 29 in the elastomeric second layer 17. Such bores 28 and 29 are not in alignment with the previously described bores 25 and 26. Such third layer 18 has a plurality of horizontally spaced metal (steel or aluminum) channels 30 embedded therein, preferably opposite and in alignment with the row of bores 25 and 26. As seen in FIGS. 2 and 3, there are three U-shaped channels 30 which correspond to the three rows of bores 25 and 26. Such steel or metal channels 30 provide stiffness and rigidity to the entire structure and provide a facile means of attaching the respective pads to the hull of the vessel in an economic manner. Each of such channels 30 have bores 31 that are smaller than bores 25 and 26 but in alignment therewith. Also, such bores 31 are in alignment with bores 32 in the third layer 18 to thus accommodate the attachment of the impact pads to vertically spaced beams 34 that are an integral part of the hull's vessel 10. A stud or bolt 35 with its shank 36 permits the attachment of such pad 15 to the spaced beams 34. This arrangement of integral parts permits fewer beams since the channels 30 provide sufficient strength to the impact pads which themselves provide the necessary strength for impact to thus provide in the combination an economical means to provide a low cost impact fender protective system. Third layer 18 with its channel 30 defines a base layer and provides a rigid integrity to the composite structure so that in its application to a given supporting structure, such as to the hull of a ship or to a dock which may be made of diverse materials, provides a resistive base of known reactive force to the rubber layer which, under those conditions, provides a high energy absorption rate that is controllable.

The above described embodiment is the preferred embodiment and as described above such layer 18 can also be a thin metal sheet which would have the channels 30 welded thereto. In this case, the bore 31 and 32 are identical in location and serve the same purpose. The described embodiment reduces weight and utilizes the feature that multi-directional forces are taken up by the cushioning layer 17.

Figure 4:
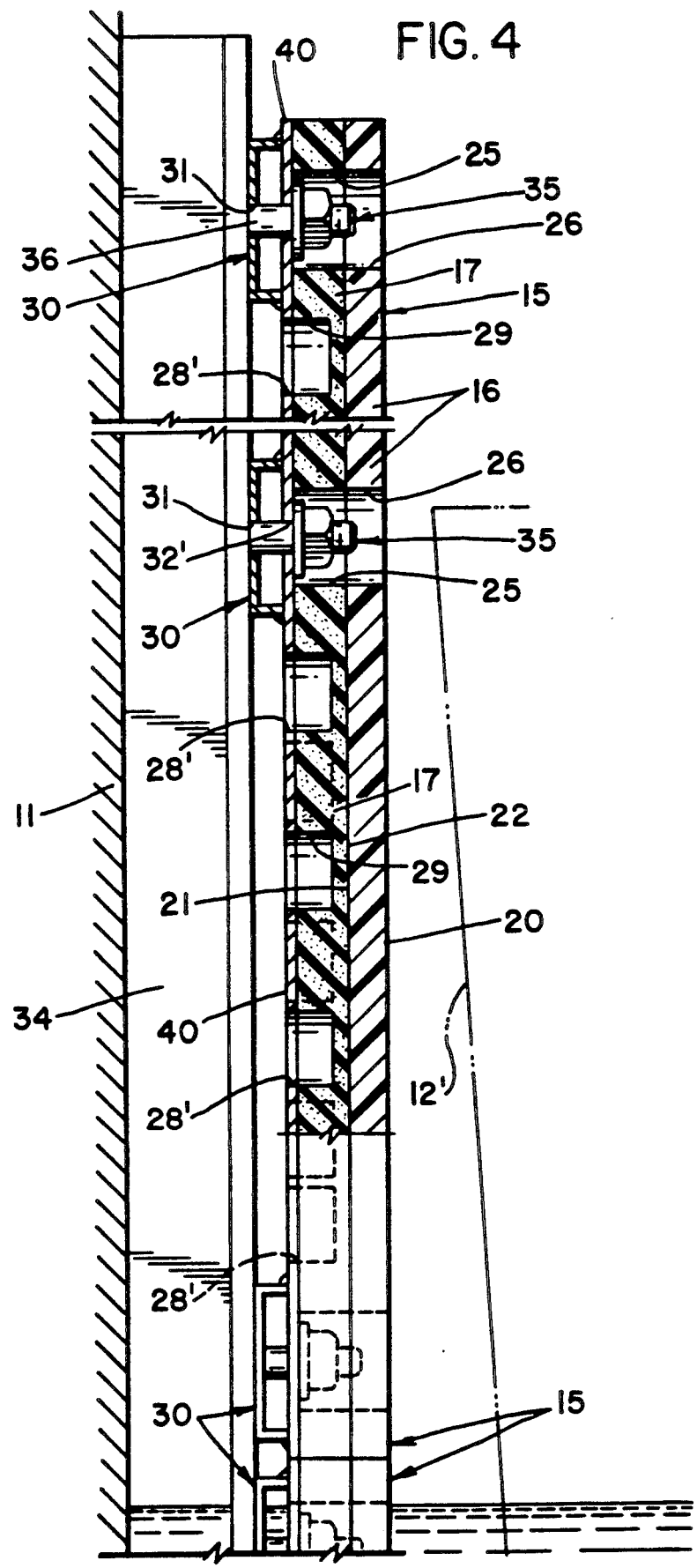
FIG. 4 is a cross sectional side elevational view of a modified fender system similar to that of FIG. 2 but showing a thin metal sheet in lieu of a polyethylene layer.

This embodiment is shown in FIG. 4 wherein the inwardly disposed layer of ultra-high molecular weight polyethylene 16 and the resilient second elastomeric layer 17 are identical to the first embodiment and designated by the same reference numerals while the thin metal sheet is designated 40 with the channel 30 shown as welded to such metal sheet.

It will be apparent that although a specific embodiment of the invention has been described in detail, the invention is not limited to the specifically illustrated and described constructions since variations may be made without departing from the principles of the invention.

I claim:

1. A fender impact pad for use in the hull of a ship, said pad being a longitudinally extending member with a first layer of ultra-high molecular weight materials, a second layer of elastomeric material secured to said first layer a third layer of rigid non-resilient material secured to said second layer; said third layer having at least one longitudinally extending rigid member secured thereto to provide rigidity to said pad for its entire length, said third layer and said rigid member having an aperture therethrough, an opening extending through said first and said second layer and being in alignment with said aperture, fastening means extending through said aperture and into said opening for securing said pad to said hull of a ship, said third layer and said second layer having a plurality of aligned bores to define chambers to facilitate impact loading on said pad, said rigid member is embedded in said third layer, and the juncture of said aperture with said opening defines a shoulder on said third layer to receive and seat said fastening means on said shoulder for fastening said pad to said hull.

2. A fender impact pad as set forth in claim 1 wherein said rigid member is a longitudinally extending metal channel member that provides rigidity to said pad and facilitates the attaching of said pad to said hull.

3. A fender impact pad as set froth in claim 2 wherein said first layer and said third layers are ultra-high molecular weight materials whose combined thickness is approximately one half the total thickness of said pad.

4. A fender impact pad as set froth in claim 2 wherein all of said layers are thick members that are bonded to each other.

5. A fender impact pad as set forth in claim 4 wherein the thickness of said second layer is in the range of one-fourth to one-half of the total thickness of said pad.

6. A fender impact pad as set forth in claim 5 wherein said pad has an impact strength greater than Douglas Fir.

7. An impact fender system for use in mounting on a support base of a ship's hull for absorbing shocks and impact forces comprising a plurality of panels in laterally and horizontally spaced rows, each panel being a longitudinally extending member, each panel having an outer layer of ultra-high molecular weight material, each of said panels having a second resilient intermediate layer of elastomeric material secured to said outer layer, each of said panels having a base layer of ultra-high molecular weight material secured to said elastomeric layer, each base layer having at least one beam member integrally formed therewith to provide rigidity to said panel and facilitate the attachment of said panel to said support base, each of said elastomeric layer and said base layer in adjacent abutting relationship having coextensive openings extending through said base layer and into said elastomeric layer to define chambers for flexing of said elastomeric layer to facilitate the compression and bulging of said elastomeric layer on said hull for receiving an impact force, means securing said base layer and said beam member to said support base, the thickness of said second layer is in a range of one-fourth to one-half of the total thickness of said panel of said fender, and said beam member is a metal channel member embedded in said base layer and extends for the full length of said panel.

8. A fender impact pad for use in the hull of a ship, said pad being a longitudinally extending member with a first layer of ultra-high molecular weight materials, a second layer of elastomeric material secured to said first layer, a third layer of rigid non-resilient material secured to said second layer; said third layer having at least one longitudinally extending rigid member secured thereto to provide rigidity to said pad for its entire length, said third layer and said rigid member having an aperture therethrough, an opening extending through said first and second layer and being in alignment with said aperture, fastening means extending through said aperture and into said opening for securing said pad to said hull of a ship, said third layer and said second layer having a plurality of aligned bores to define chambers to facilitate impact loading on said pad, said third layer being a metal sheet.

9. A fender impact pad as set forth in claim 8, wherein said third layer is approximately one fourth of an inch thick, and said rigid member is secured to said third layer to provide rigidity to said impact pad.

* * * * *